United States Patent [19]

Flanagan et al.

[11] Patent Number: 4,925,109
[45] Date of Patent: May 15, 1990

[54] FOAMING APPARATUS

[75] Inventors: Thomas Flanagan, Loughrea; Robert V. McMurry, Ballybay; Patrick O'Donoghue, Bishopstown; Timothy O'Donoghue, Blackrock; Michael McKeon, Taney Rise; John Breen, Rathmines, all of Ireland

[73] Assignees: Pandion Haliaetus Limited; Silver Security Limited; Champion Security Limited; Linara Investments Limited, all of Dublin, Northern Ireland

[21] Appl. No.: 314,856

[22] Filed: Feb. 24, 1989

[30] Foreign Application Priority Data

Feb. 24, 1988 [GB] United Kingdom ............... 496/88

[51] Int. Cl.⁵ .......................... B05B 7/26; B05B 7/06
[52] U.S. Cl. ................................. 239/429; 239/432
[58] Field of Search ............... 239/8, 311, 343, 428.5, 239/429, 432, 434; 261/DIG. 26; 169/15

[56] References Cited

U.S. PATENT DOCUMENTS

| | | | |
|---|---|---|---|
| 2,090,727 | 8/1937 | Gosmann | 239/343 |
| 3,388,868 | 6/1968 | Watson et al. | 239/432 X |
| 3,801,015 | 4/1974 | Hayes | 261/DIG. 26 X |
| 4,366,081 | 12/1982 | Hull | 261/DIG. 26 X |
| 4,830,790 | 5/1989 | Stevenson | 239/428.5 X |

Primary Examiner—Andres Kashnikow
Assistant Examiner—William Grant
Attorney, Agent, or Firm—Sughrue, Mion, Zinn, Macpeak & Seas

[57] ABSTRACT

Foaming apparatus for foaming a water detergent mixture using compressed air comprises a housing having an elongated main bore extending therethrough. An upstream portion of the main bore is tapered in a generally downstream direction. A jet of water detergent mixture is delivered axially into the tapered portion of the main bore through a first orifice. Four second orifices extending transversely into the tapered portion deliver compressed air for mixing with and foaming the jet of water detergent mixture. Foamed water and detergent mixture is delivered through an outlet at the downstream end of the bore.

17 Claims, 3 Drawing Sheets

FOAMING APPARATUS

FIELD OF THE INVENTION

The present invention relates to foaming apparatus for foaming a mixture of water and detergent, in particular it relates to foaming apparatus for use in car wash apparatus such as the type normally used for washing cars, trucks, vans, buses, or indeed any other vehicle or device. For convenience, such washing apparatus will be referred to as car wash apparatus hereinafter. The invention also relates to car wash apparatus incorporating the foaming apparatus.

BACKGROUND TO THE INVENTION

In washing cars, a mixture of water and detergent is applied to the vehicle and left for a number of minutes to enable the water detergent mixture to penetrate through the dirt. This is then normally rinsed off with either hot or cold water. The water detergent mix may be hot or cold. It is important that the water detergent mix should remain on the vehicle for as long as possible to enable adequate penetration of the dirt. Thus, it is preferable that the water detergent mixture should be applied to the vehicle in foam form. It has been found that where the water detergent mix is applied in foam form it remains as a result of surface tension for longer periods. An unfoamed water detergent mix, in general, runs off the vehicle.

A number of different types of foaming apparatus are known. Normally, these foaming apparatus aerate either the water or water detergent mixture prior to it being delivered to a hand held nozzle or other such suitable nozzle for delivery to the vehicle. However, these known devices require that the outlet orifice in the hand held nozzle should be of a relatively large cross section. Otherwise, adequate foaming of the water detergent mix is not achieved. While such a large cross section outlet orifice does not present any difficulty in the delivery of the foam to the vehicle, it does cause considerable problems when one wishes to deliver water or other water mixtures under pressure to the vehicle. The large outlet orifice causes a considerable pressure drop and unless one provides substantial pump capacity, it is not possible to deliver water under any reasonable pressure to the vehicle. This is unsuitable for water rinsing and the like. To overcome this problem, it has been necessary to provide two nozzles, one with a large outlet orifice for delivering foam and the other with a small outlet orifice for delivering water or other water mixtures under pressure. This, however, it will be appreciated, is cumbersome, and also relatively expensive. It further can lead to confusion amongst operators of the apparatus because of the nozzles.

There is therefore a need for foaming apparatus which causes foaming of a water detergent mixture and which enables the foamed mixture to be delivered to a vehicle through a nozzle with an outlet orifice of size smaller than has been possible heretofore. There is also a need for car wash apparatus incorporating such foaming apparatus.

OBJECTS OF THE INVENTION

One object of the invention is to provide foaming apparatus for use in a car wash apparatus which overcomes the problems of foaming apparatus known heretofore. Another object of the invention is to provide foaming apparatus which permits a foamed water detergent mixture to be delivered through a nozzle outlet orifice of relatively small cross sectional area. A further object of the invention is to provide car wash apparatus which provides a substantial degree of foaming of a water detergent mixture. A further object of the invention is to provide car wash apparatus incorporating the foaming apparatus.

SUMMARY OF THE INVENTION

According to the invention, there is provided apparatus for foaming a mixture of water and detergent, the apparatus comprising a housing having a main bore extending therethrough from an upstream end to a downstream end, the main bore having a tapered portion adjacent the upstream end tapering in a generally downstream direction a water and detergent inlet being provided at the upstream end of the main bore, the water and detergent inlet being formed by a first orifice for delivering a mixture of water and detergent into the tapered portion of the main bore in a generally axial direction relative to the main bore, at least one air inlet formed by a second orifice in a side wall of the tapered portion of the main bore for delivering compressed air into the tapered portion of the main bore for mixing with the water and detergent mixture, and an outlet at the downstream end of the main bore for delivering the foamed water and detergent mixture.

Preferably, the first orifice is co-axial with the central axis of the main bore. Advantageously, the second orifice defines an axis which extends in a generally transverse direction relative to the central axis of the main bore. In a preferred aspect of the invention, four second orifices are provided equi-spaced circumferentially around the tapered portion of the main bore.

In one embodiment of the invention, the main bore is of circular cross sectional area, and preferably, the first orifice is of circular cross sectional area, and advantageously the second orifice is of circular cross sectional area.

In another embodiment of the invention, the housing comprises an inner housing through which the main bore extends, and an outer housing extending round the inner housing, the inner and outer housing defining therebetween an annular chamber, each second orifice communicating between the annular chamber and the tapered portion of the bore.

In a further aspect of the invention, the main bore extends from the tapered portion of the bore in a generally downstream direction to form an elongated mixing chamber for mixing the water and detergent mixture and compressed air, the cross sectional area of the main bore being substantially constant over the length of the mixing chamber.

In a still further embodiment of the invention, a bead chamber is provided downstream of the mixing chamber, the bead chamber comprising a plurality of beads, and being defined at its upstream and downstream end by respective spaced apart screens having a plurality of openings therethrough.

Further, the invention comprises car wash apparatus comprising the apparatus according to the invention for foaming a mixture of water and detergent.

Additionally, the invention provides a method for foaming a water detergent mixture using the foaming apparatus according to the invention, the method comprising the steps of delivering a mixture of water and detergent into the tapered portion of the bore in a generally axial direction through the first orifice, delivering compressed air into the tapered portion of the bore in a generally transverse direction through the second orifice for mixing and foaming the detergent water mixture.

ADVANTAGES OF THE INVENTION

The advantages of the invention are many. A particularly important advantage achieved by the invention is that the foamed water and detergent mixture delivered by the foaming apparatus may be delivered through a nozzle with an outlet orifice of relatively small cross sectional area. This enables a single nozzle to be used for delivering the foamed water and detergent mixture and rinsing water.

Why the foaming apparatus provides such advantages is not altogether fully understood. However, it is believed that it may be by virtue of the fact that the compressed air is introduced transversely of the jet of water and detergent mixture in the tapered portion of the bore.

These and other objects and advantages of the invention will be readily apparent from the following description of a preferred embodiment which is given by way of example only.

Figure 4:
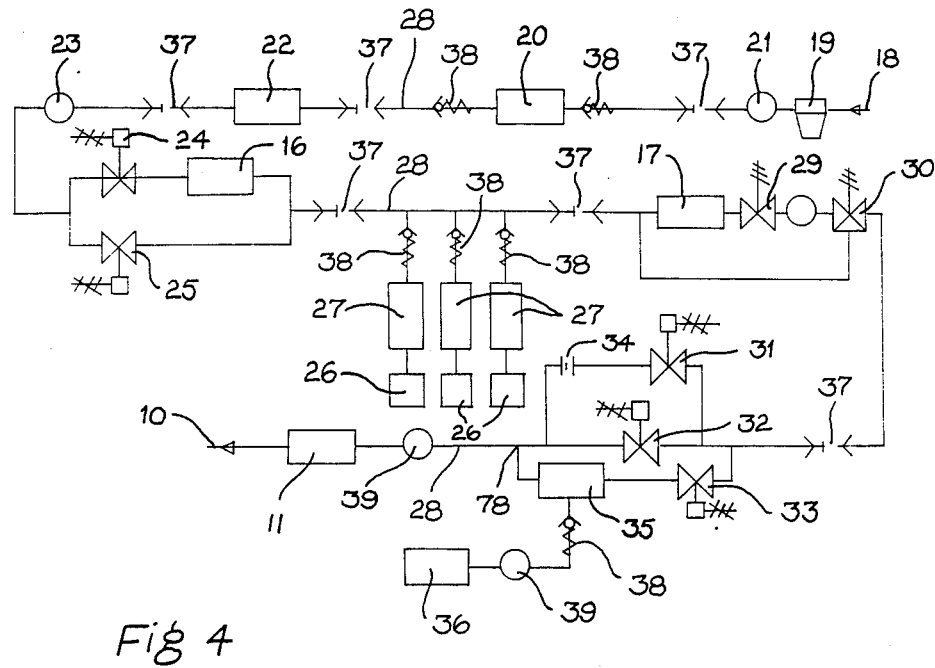
FIG. 4 is a circuit diagram of the apparatus of FIG. 1, Referring to the drawings, there is illustrated car wash apparatus indicated generally by the reference numeral 1. The apparatus 1 is of the type normally referred to as hot wash apparatus. It delivers hot or cold water as required through a detachable nozzle 2 to a car or vehicle to be washed. It also delivers a hot or cold mixture of water and detergent and/or water and wax. The apparatus 1 comprises a housing 3 having a lower portion 4 where most of the components to deliver and heat the water are provided. Only some of the components are illustrated in FIG. 1, however, the circuit diagram of FIG. 4 illustrates the hydraulic connections of all the components of the apparatus and these are described below. Doors 5 close the lower portion 4 of the housing 3. An upper portion 6 of the housing 3 houses a control box 8 for controlling the operation of the various components. The control box is illustrated pivoted out of the upper housing 6. In normal use, it is enclosed in the housing 6 by a door 9. The nozzle 2 is connected at the end of a hose 10 which is wound onto a reel 11 mounted in the upper housing 6. Trays 14 which are slidable on tracks 15 in the lower housing 4 support a heater 16 for heating the water and a pump motor unit 17 for delivering the water through the nozzle 2 to the car or vehicle. By virtue of the fact that the heater and pump motor unit 10 and 17 respectively are mounted on the trays 14, they can readily easily be slid in and slid out for replacement.

Referring now to the circuit diagram of FIG. 4, a water inlet 18 delivers water into a filter 19 mounted in the lower housing 4. The water is delivered from the filter 19 to a booster pump 20 through a pressure switch 21. The water is then delivered to a water softening unit 22 where it is delivered through a flowswitch 23 into two solenoid operated valves 24 and 25. Where hot water is required, the water is delivered through the valve 24 to the water heater 16 and where cold water is required, the water is delivered through the valve 25 to bypass the heater 16. Detergent and/or wax which is stored in tanks 26 is injected by pumps 27 into the line 28 of the circuit. The pump motor unit 17 delivers the water or water mixture through safety valves 29 and 30 to three solenoid powered valves 31, 32 and 33. The valve 29 is a blow off valve, while the valve 30 is a recirculating valve which recirculates the water or water mixture from the pump outlet back to the motor inlet in the event of a build-up of pressure. The solenoid valve 31 directs the water mixture through a restrictor 34. This valve is normally used to deliver a water wax mixture through the restrictor 34. The valve 32 is normally used for delivering water or a water detergent mix through the line 28. The valve 33 delivers the mixture which is normally a water detergent mixture through foaming apparatus 35 according to the invention which is described below. An air compressor 36 delivers compressed air to the foaming apparatus 35. The output from the valves 31 to 33 continues through the line 28 to the hose 10 wound on the reel 11, where it is in turn delivered through the nozzle 2. A pressure sensor 39 is provided in the line 28 upstream of the reel 11.

Quick release couplings 37 and non-return valves 38 are provided throughout the circuit to facilitate ease of removing certain of the components and in some cases the non-return valves prevent back feed.

The control box 8 controls the operation of the various components including solenoid valves, beater, pump motor unit and the like depending on the washing cycle required.

The operation of such car wash apparatus will be well known to those skilled in the art, and it is not intended to describe the operation in further detail.

Figure 1:
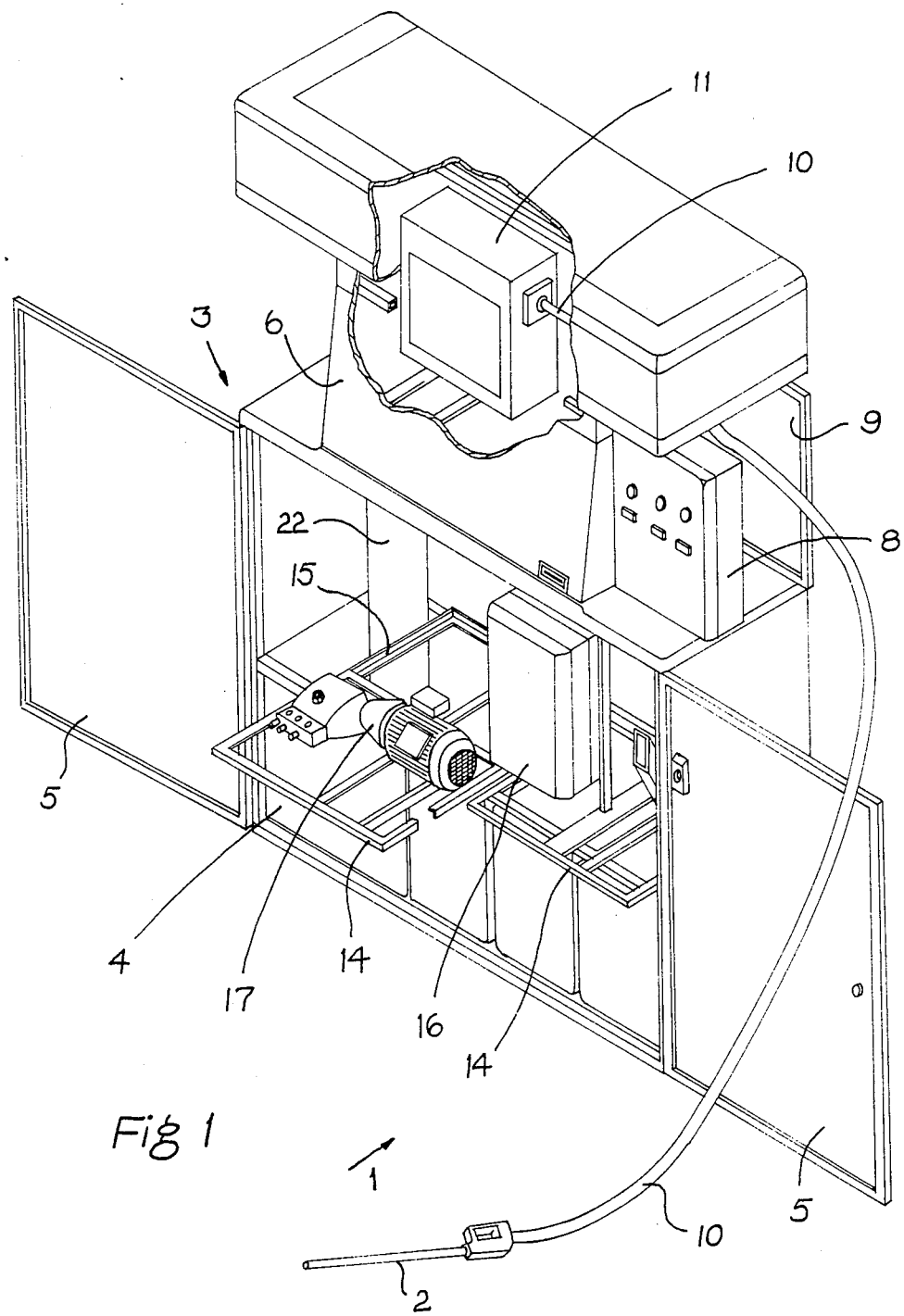
FIG. 1 is a perspective view of car wash apparatus according to the invention.
Figure 2:
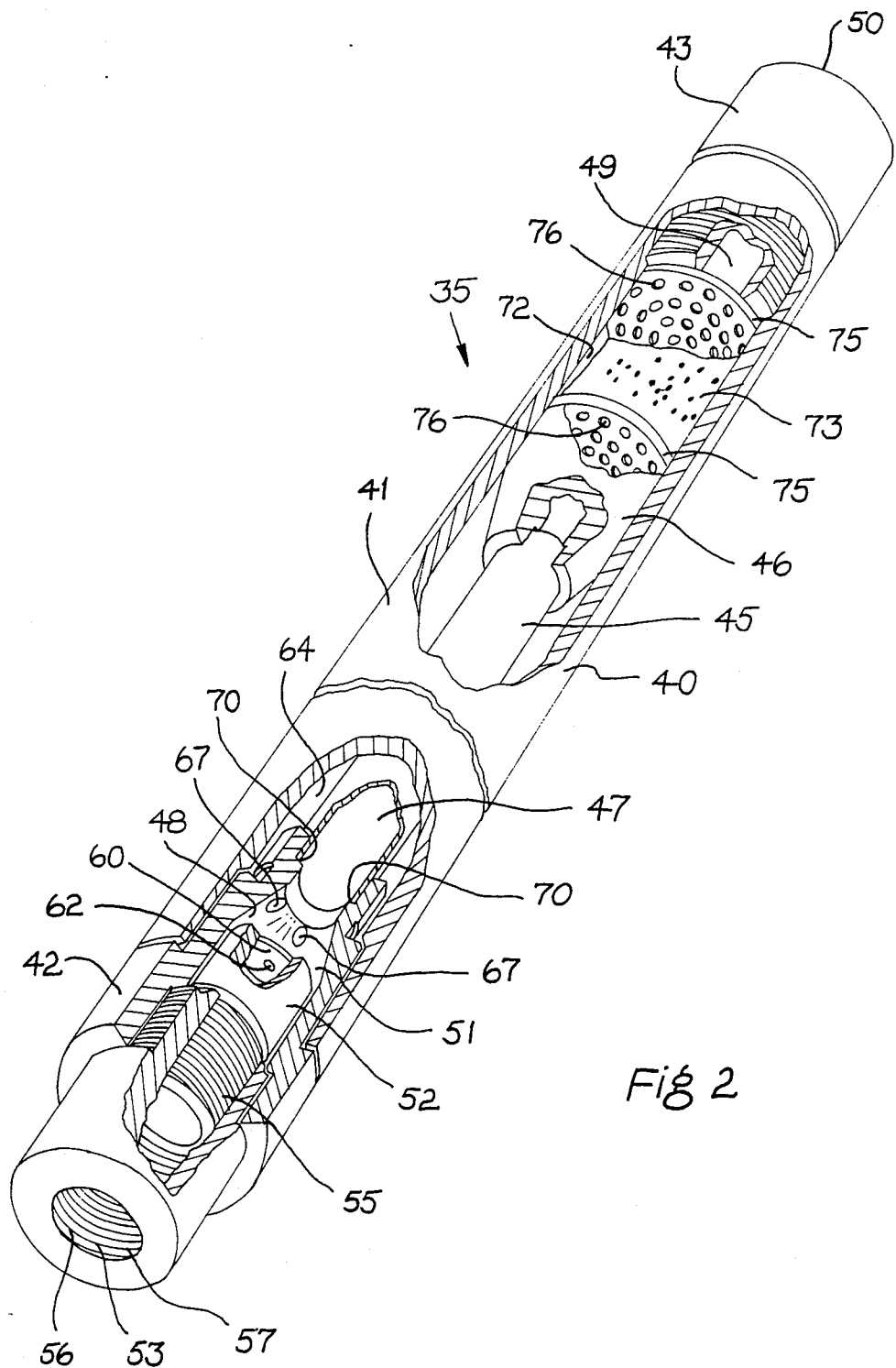
FIG. 2 is a partly cut away perspective view of foaming apparatus also according to the invention for foaming a water detergent mixture for use in the car wash apparatus of FIG. 1.
Figure 3:
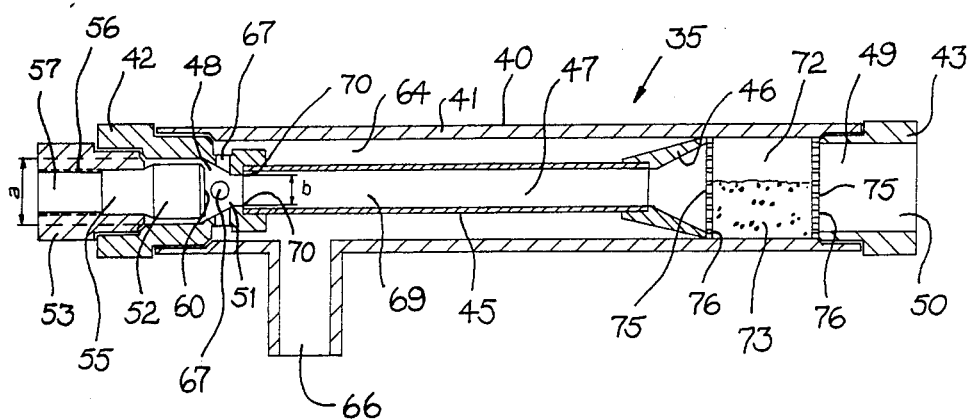
FIG. 3 is a cross sectional view of the foaming apparatus of FIG. 2.

Referring now to FIGS. 2 and 3, the apparatus 35 also according to the invention for foaming the water and detergent mix is illustrated. The apparatus 35 comprises a housing 40 having an outer housing formed by an outer tubular member 41 of steel. A pair of end members 42 and 43 of steel are provided at the ends of the tubular member 41. An inner housing formed by an inner tubular member 45 also of steel extends between the end member 42 to an intermediate member 46 in the tubular member 41. The inner tubular member 45 in combination with the outer tubular member 41, the end members 42 and 43 and the intermediate member 46 form a main bore 47 of circular cross sectional area which extends through the housing 41. The main bore 47 has an upstream end 48 and a downstream end 49. The end member 43 forms an outlet 50 from the main bore 47. The outer tubular member 41 and inner tubular member 45 together with the upstream end member 42 and intermediate member 46 define an annular chamber 64 for receiving compressed air from the compressor 36 through a port 66 in the outer tubular member 41 as will be described below.

A portion 51 of the main bore 47 at the upstream end tapers in a generally downstream direction. The greatest diameter of the tapered portion 51 of the main bore, namely the diameter "a" is 17 mm, and the smallest diameter, namely, the diameter "b" is 8 mm. The length of the tapered portion of the bore is 11 mm.

A water detergent mixture inlet at the upstream end 48 delivers a jet of water detergent mixture into the tapered portion 51 in a generally axial direction. The inlet is formed by a jet housing 52 secured in a nipple 53 which is in turn secured by threads 54 in the end member 42. Threads 55 on the jet housing 52 engage corresponding threads 56 in a bore 57 of the nipple 43. A bore 59 extends through the jet housing 52 and an end wall 60 closes the bore 59. A first orifice 62 in the end wall 60 delivers the jet of water and detergent mixture into the tapered portion 51 of the main bore 47. The first orifice 62 is of circular cross section having a diameter of 0.91 mm and is co-axial with the central axis of the main bore 47.

An air inlet for delivering compressed air from the annular chamber 64 into the tapered portion 51 of the main bore 47 for mixing with and foaming the jet of water and detergent mixture is provided by four second orifices 67 through the upstream end member 42 which are equi-spaced circumferentially around the tapered portion of the bore 51. The orifices 67 communicate between the annular chamber 64 and the tapered portion 51 and their axes extend in a generally transverse direction relative to the central axis of the main bore 47.

The tapered portion 51 of the main bore 47 terminates in a mixing chamber 69 which is formed by the inner tubular member 45. The water detergent mixture and compressed air are thoroughly mixed in the mixing chamber 69 for aeration and foaming of the water detergent mixture. A step change in cross sectional area is provide at 70 between the tapered portion 51 and the mixing chamber 69 which further facilitates the formation of turbulence to further facilitate mixing of the water detergent mixture with the compressed air for aerating and foaming the water detergent mixture. The mixing chamber 69 terminates in the intermediate member 46 and the main bore 47 converges in a generally downstream direction through the intermediate portion 46. A bead chamber 72 is formed by the main bore 47 downstream of the intermediate member 46. The bead chamber 72 comprises a plurality of loosely stored beads 73 each of approximately 3 mm diameter. The beads 73 approximately three-quarter fill the bead chamber 72. The upstream and downstream ends of the bead chamber 72 are formed by a pair of screens 75 of plastics material with a plurality of holes 76 of approximately 1 mm diameter extending therethrough. The beads 73, it has been found, cause considerable turbulence of the compressed air and water and detergent mixture, thereby further aerating the mixture to form foam. The foamed mixture is delivered from the main bore 47 through the outlet 50 for connection into the line 28 at 78, see FIG. 4, and for subsequent delivery through the hose 10 into the nozzle 2.

The nozzle 2 is provided with an outlet orifice (not shown) of circular cross section of 1.6 mm diameter. By providing a nozzle orifice outlet of such size water under adequate pressure can be delivered to the vehicle for rinsing and the like. Further, because of the degree of foaming achieved in the apparatus 35, the nozzle outlet orifice of 1.6 mm diameter has been found to be quite adequate for delivering foam onto the vehicle. In fact, it has been found that there may be a relationship between the cross sectional areas of the first orifice 62 and the nozzle outlet orifice (not shown).

It is believed that adequate results can be achieved when the cross sectional area of the nozzle outlet orifice is at least 1.75 times the cross sectional area of the first orifice 62. Further, it has been found that good results are achieved when the first orifice 62 is of 0.91 mm diameter, it is believed that adequate results could be achieved with a first orifice 62 of diameter in the range of 0.84 mm to 1.09 mm.

In use, to operate the car wash apparatus 1 a trigger (not shown) in the nozzle 2 is depressed, thereby activating the apparatus. Depending on the particular type of wash requested, the apparatus will operate under the control of the control circuitry in the control box 8 and the appropriate cycle will be selected. The operation of such car wash apparatus will be known to those skilled in the art. When a foam mixture of water and detergent is required for delivery to the vehicle being washed, detergent is injected into the line 28 from the appropriate tank 26. The valves 31 and 32 are closed, and the valve 33 is opened. Thus, the water and detergent mixture flows through the foaming apparatus 35 where it is foamed and delivered through the line 10 for delivery through the nozzle 2 onto the vehicle. In this embodiment of the invention, the mixture of water and detergent is supplied into the bore 59 of the jet housing at 1,000 p.s.i. A pressure drop is developed across the orifice 62 and the jet of water and detergent issuing from the orifice 62 into the tapered portion 51 is approximately at a pressure of 100 to 150 p.s.i. The compressed air being delivered through the second orifices 67 is maintained at a slightly higher pressure than the pressure in the jet of water and detergent mixture, preferably at a pressure of 10 p.s.i. or greater than the pressure of the jet of water and detergent mixture. In this case, the compressor is capable of delivering compressed air in the range of 150 p.s.i. to 200 p.s.i. In practice, it has been found that, in general, the pressure of the jet of water and detergent mixture issues from the orifice 62 at approximately 130 p.s.i. By delivering the compressed air at 150 p.s.i. through the second orifices 67 particularly good foaming results are achieved.

The mixture of water and detergent and the compressed air travels through the mixing chamber 69 where further aeration and foaming of the water detergent mix takes place. Further foaming occurs as the mixture is expanded in the main bore 47 as it passes through the intermediate chamber 46. Further foaming still of the water detergent mixture occurs in the bead chamber 72 and where the water and detergent mixture and compressed air pass through the screens 75. In fact, it has been found that substantial turbulence is generated by the bead 73 in the bead chamber 72, thereby substantially enhancing the foaming of the water and detergent mixture.

The foamed water and detergent mixture is then delivered into the line 28 at 78 where it is in turn delivered through the holes 10 into the nozzle 2 for delivery through the nozzle outlet orifice (not shown) onto a vehicle to be washed.

While in the embodiment of the invention described, the water detergent mixture has been described as being delivered through the jet housing bore 59 in the apparatus 35 at 1,000 p.s.i., the water and detergent mixture could be delivered at other pressures without departing from the scope of the invention. In fact, it is believed that adequate results could be achieved within a pressure range of 800 p.s.i. to 1200 p.s.i. Further, it is envisaged that the compressed air could be maintained at other desired pressure differentials over the pressure of the jet of water and detergent mixture. Indeed, in certain cases it is envisaged that the pressure differential may be less than 10 p.s.i. and it may, in fact, be as high as 100 p.s.i.

While specific dimensions of the tapered portion have been given, it will be appreciated that the size and shape of the tapered portion could be varied without departing from the scope of the invention. Needless to say, the main bore could be of other cross sections besides circular cross section.

It will be appreciated that while a particular construction of housing of the car wash apparatus has been described, any other suitable construction could be used without departing from the scope of the invention. Similarly, other suitable releasable mounting means besides trays could be used. It is also, of course, not necessary that the trays should be releasable.

It will also, of course, be appreciated that the control box 8 need not be pivotally mounted. Further, it is envisaged in certain cases, that instead of mounting the apparatus in a closed housing, it could be provided by an open framework, in which case it is envisaged that it will be mounted indoors. While the apparatus has been described as comprising an effectively sealed unit against weather, this is not necessary.

Additionally, it will be appreciated that while the components have been described as being connected together by means of quick release couplings, any other suitable couplings could be used. Further, it will be appreciated that quick release couplings incorporating shut-off valves may, if desired, be provided. Indeed, in certain cases, it is envisaged that independent shut-off valves may be provided on one or both sides of each quick release coupling for shutting off supply to the component or quick release coupling to facilitate removal or replacement of the component. It is also envisaged in certain cases that instead of connecting the detergent and wax line into the main line, it could be connected directly into the pump. It is also envisaged that in certain cases, the injector pumps may be dispensed with, without departing from the scope of the invention. For example, the detergent and/or wax could be drawn into the main line by means of venturi arrangements or the like. Needless to say, suitable valving arrangements, in such cases, would be provided.

Furthermore, it will be appreciated while a particular schematic arrangement of the components has been illustrated, any other suitable arrangement could be used. In fact, in certain cases, it is envisaged the water heater if desired may be mounted downstream of the motor/pump unit. Further, in certain cases the water treatment unit may be dispensed with altogether. It will also, of course be appreciated that the hose reel could be mounted in any desired location, besides in the superstructure, indeed in many cases, it is envisaged it may be mounted exteriorly of the housing, and in certain cases it is envisaged that a hose reel may be dispensed with. While the nozzle has been described as being detachable, while this has the advantage that at night it may be removed altogether, thus permitting the hose to be wound totally within the superstructure, and the nozzle may be stored either within the housing, or in any safe location, this is not necessary.

It will also of course be appreciated that while an electrical beater has been described, any other suitable water heating arrangement could be used without departing from the scope of the invention.

Further it will be appreciated that while a particular construction of foaming apparatus has been described, any other suitable construction could be used without departing from the scope of the invention. Indeed, it is envisaged that while the foaming apparatus has been described as being mounted in a particular type of car wash apparatus, it could be mounted in any other type of car wash apparatus, or indeed any other apparatus where it is desired to foam a mixture of water and detergent or water and solvent or a mixture of water and any other fluid or particulate material.

It is envisaged in certain cases that the length of the mixing chamber may be considerably shortened. Further, in certain cases, it is envisaged that the beads and the chamber containing the beads may be dispensed with. Alternatively, other suitable turbulence generating means may be provided besides beads. In fact, in certain cases, it is envisaged that the mixing chamber may also be dispensed with.

While four air second orifices have been provided into the tapered portion of the main bore, this is not necessary, one single second orifice would be sufficient. Further, the first orifice need not be provided co-axial of the main bore.

It will, of course, be appreciated that while particular diameters of jet sizes have been described, any other jet sizes may be used without departing from the scope of the invention. Further, it is envisaged that foaming apparatus may be provided with jet sizes which are outside the relationships given above without departing from the scope of the invention.

It will also be appreciated that the bores of the jets need not be circular, they could be of any other suitable cross sectional area. Needless to say, the bores forming the main bore of the foaming apparatus could also be of any other cross section besides circular, as indeed could the overall construction of the foaming apparatus.

We claim:

1. Apparatus for foaming a mixture of water and detergent, the apparatus comprising:
    a housing having a main bore extending therethrough from an upstream end to a downstream end, the main bore having a tapered portion adjacent the upstream end tapering in a generally downstream direction,
    a water and detergent inlet being provided at the upstream end of the main bore the water and detergent inlet being formed by a first orifice for delivering a mixture of water and detergent into the tapered portion of the main bore in a generally axial direction relative to the main bore,
    at least one air inlet formed by a second orifice in a side wall of the tapered portion of the main bore for delivering compressed air into the tapered portion of the main bore for mixing with the water and detergent mixture,
    an elongated mixing chamber for mixing the water and detergent mixture and compressed air, the mixing chamber being formed by a portion of the main bore extending from the tapered portion of the bore in a generally downstream direction, the cross sectional area of the main bore being substantially constant over the length of the mixing chamber and being greater than the smallest cross sectional area of the tapered portion of the bore, and
    an outlet at the downstream end of the main bore for delivering the foamed water and detergent mixture.

2. Apparatus as claimed in claim 1 in which the first orifice is co-axial with the central axis of the main bore.

3. Apparatus as claimed in claim 1 in which the second orifice defines an axis which extends in a generally transverse direction relative to the central axis of the main bore.

4. Apparatus as claimed in claim 1 in which four second orifices are provided equi-spaced circumferentially around the tapered portion of the main bore.

5. Apparatus as claimed in claim 1 in which the main bore is of circular cross sectional area.

6. Apparatus as claimed in claim 1 in which the first orifice is of circular cross sectional area.

7. Apparatus as claimed in claim 1 in which the second orifice is of circular cross sectional area.

8. Apparatus as claimed in claim 1 in which the housing comprises an inner housing through which the main bore extends, and an outer housing extending round the inner housing, the inner and outer housing defining therebetween an annular chamber, each second orifice communicating between the annular chamber and the tapered portion of the bore.

9. Apparatus as claimed in claim 1 in which a bead chamber is provided downstream of the mixing chamber, the bead chamber comprising a plurality of beads, and being defined at its upstream and downstream end by respective spaced apart screens having a plurality of openings therethrough.

10. Apparatus as claimed in claim 9 in which the bead chamber comprises beads to approximately three-quarters of its volume.

11. Apparatus as claimed in claim 9 in which the main bore diverges in a generally downstream direction between the mixing chamber and the bead chamber.

12. Apparatus as claimed in claim 1 in which a step change in the cross sectional area of the main bore is provided between the tapered portion of the bore and the mixing chamber.

13. Apparatus as claimed in claim 1 in which the diameter of the first orifice is in the range of 0.84 mm to 1.09 mm.

14. Apparatus as claimed in claim 1 in which a nozzle outlet is connected to the downstream outlet, the nozzle having an outlet orifice, the cross sectional area of the outlet orifice being at least 1.75 times the cross sectional area of the first orifice.

15. Apparatus as claimed in claim 14 in which the nozzle is remotely mounted of the apparatus.

16. Apparatus as claimed in claim 1 in which means for delivering compressed air is provided for delivering compressed air to the air inlet.

17. Apparatus for foaming a mixture of water and detergent as claimed in any of claims 1–16, wherein said apparatus is a car wash apparatus.

* * * * *